Patented Feb. 20, 1945

2,370,113

UNITED STATES PATENT OFFICE 2,370,113

LIQUID DIELECTRIC COMPOSITION

Russell L. Jenkins, Webster Groves, Mo., assignor to Monsanto Chemical Company, St. Louis, Mo., a corporation of Delaware No Drawing. Application August 2, 1940, Serial No. 350,121

10 Claims. (Cl. 252—65)

The present invention relates to new compositions of matter having a combination of desirable properties, particularly high dielectric constant, which renders them especially suitable for dielectric use in capacitators and other electrical devices. Specifically, the invention relates to chlorinated ortho-nitrodiphenyl mixtures having a combined chlorine content of approximately 38 to 44% which corresponds to approximately 3.45 to 4.40 atoms of chlorine substituted in the diphenyl nucleus. Pure tetrachloro-mononitrodiphenyls themselves have a theoretical chlorine content of 42.1%.

The principal object of the present invention is to provide a composition of matter having a desirable combination of properties adapting it for use as a capacitor dielectric fluid and in other electrical devices, such desirable properties including high dielectric constant and high dielectric strength. Other objects and advantages of the invention, some of which are referred to specifically hereinafter, will be apparent from the perusal of this specification.

Halogenated diphenyls, particularly mixtures of chlorinated diphenyls, have heretofore been used for dielectric purposes. Pure nitrated chlorodiphenyls and mixtures of nitrated chlorodiphenyls are also known and some have been used for the same general purpose. However, improvements in certain of the properties of such compositions, particularly in dielectric properties, are desirable in the electrical industry.

I have discovered that if ortho-nitrodiphenyl is subjected to direct chlorination until approximately four atoms of chlorine have been substituted in the diphenyl nucleus, a composition is obtained that has a pour point of approximately 20° to 24° C. and a dielectric constant of approximately 20 to 24 at 30° C. (1000 cycles). This composition is believed to be a mixture of isomeric tetrachloro-ortho-nitrodiphenyls together with smaller amounts of less and of more highly chlorinated ortho-nitrodiphenyls and is normally liquid and does not crystallize on prolonged standing at normal temperatures.

This result was unexpected since the heretofore prepared polychloronitrodiphenyls are crystalline solids of rather high melting point or resinous solids of relatively high pour point; other mixtures of polychlorinated nitrodiphenyls which I have prepared are crystalline products or, when first prepared, liquid products which soon crystallize on standing either completely or for the greater part. The dielectric constant of ortho-nitrodiphenyl, during chlorination, undergoes marked changes, increasing with progressive chlorination, reaching a maximum and thereafter decreasing. This curve of dielectric constant varies somewhat, of course, with each different chlorination procedure, depending upon the composition of the particular chlorination reaction mixture but in general the dielectric constant curves for any chlorination mixture of ortho-nitrodiphenyl follow the general trend, passing through a maximum dielectric constant. The dielectric constants of the liquid non-crystallizing mixtures of the present invention are close to the maximum noted during the direct chlorination of ortho-nitrodiphenyl.

Mixtures of isomeric chlorinated para-nitrodiphenyls of the same chlorine contents which I have prepared in analogous manners are crystalline solids. Tetrachlorinated mixtures of equal parts by weight of ortho and para-nitrodiphenyls also crystallize nearly completely on standing several days. It is believed that to obtain the mixtures of my invention the ortho-nitrodiphenyl that is chlorinated must be substantially free from any substantial proportion (less than 5% or thereabout) of para-nitrodiphenyl to obtain non-crystallizing compositions. The term non-crystallizing as used throughout this specification refers to the property of not crystallizing when allowed to stand for prolonged periods at room or normally prevailing atmospheric temperatures.

It is believed necessary to chlorinate the ortho-nitrodiphenyl directly since the nitro group of the nitrodiphenyl apparently has a directing influence on the chlorine atoms substituted in the diphenyl nucleus. Direct nitration of a chlorinated diphenyl of the requisite chlorine content has not provided the same compositions, since the nitro groups probably enter other positions in addition to the desired ortho position; dinitro compounds are probably formed to some extent, and the proportion of the various isomers with regard to the position of the four chlorine substituents are probably different from those obtained by direct chlorination of ortho-nitrodiphenyl. Theoretically it should be possible to duplicate my mixtures by other methods of preparation or by synthesizing them from pure compounds, but these mixtures are rather complex and consist of a number of isomeric constituents that are not readily separated and identified. It has not been possible to determine the actual constituents or their proportions in the particular compositions of my invention nor to develop other general alternative methods for the preparation of the compositions.

In preparing the compositions of my invention, orthonitrodiphenyl which is substantially free of para-nitrodiphenyl or which contains not more than 5 per cent or thereabout of para-nitrodiphenyl is chlorinated directly in the presence of an iron catalyst. The catalyst may be anhydrous ferric chloride, ferric oxide or metallic iron, both iron and ferric oxide probably reacting during the chlorination to give iron chlorides that are the effective catalysts. Other catalysts may be used, including antimony chloride, aluminum chloride or its equivalent, aluminum metal, although reaction conditions must be carefully controlled to approximate the specific conditions disclosed herein for the chlorination in the presence of iron or ferric chloride. The proportion of catalyst to use is exemplified in the description hereinafter. Generally less than 1% of anhydrous ferric chloride is ample or chlorination in the presence of iron metal may be used.

The chlorination of ortho-nitrodiphenyl may be conducted in an apparatus such as described in my Patent No. 1,892,397 and substantially as therein described for the chlorination of diphenyl except for temperatures. The ortho-nitrodiphenyl is chlorinated until the combined chlorine content of the resulting composition is approximately 38 to 44% which corresponds approximately to the substitution by chlorine of 3.45 to 4.40 atoms of hydrogen of the ortho-nitrodiphenyl molecule. The extent of the chlorination can be determined as the chlorination progresses by noting the increase in weight of the reaction mixture or by noting the weight of the chlorine charged, provided reaction is fairly complete and no appreciable amount of chlorine is leaving with the excess hydrogen chloride in the latter case. However, it is more convenient in plant practice to note the progress of the chlorination by measurement of the specific gravity of the reaction mixture. The specific gravity at 90° C. (compared to water at 15.5° C., which is referred to hereinafter as specific gravity at 90°/15.5° C.) of the purified mixture will be approximately 1.45 to about 1.51, although suitable adjustment to compensate for varying amounts of catalysts suspended or dissolved in different reaction mixtures should be made. This range of 1.45 to 1.51 in the specific gravity at 90°/15.5° C. does not cover exactly the same range as 38 to 44% chlorine content but closely approximates that range. In actual chlorination the specific gravity at 90°/15.5° C. of the crude reaction mixture containing catalyst will be from about 1.45 to 1.53 or thereabout, depending upon the particular catalyst used and the proportion thereof present in the reaction mixture.

Liquid-phase catalytic chlorination conditions preferably such that a thermosyphonic flow of the reacting mass through the catalyst is induced and maintained by the action of the incoming chlorine gas on the ortho-nitrodiphenyl, as described in my Patent No. 1,892,397, are preferred.

The chlorination may also be conducted in a solvent such as carbon tetrachloride or higher boiling inert solvents, in which event the chlorination may be more easily controlled. The choice of a solvent and proper reaction conditions must be made with care, however, since both the solvent and temperature have some effect on the proportion and character of the isomeric constituents of the resulting composition. The direct chlorination in the absence of a solvent is capable of adequate control and since the production from a single unit is greater, I prefer to conduct the chlorination in the absence of a solvent and have devoted greatest attention to this specific method and the specific conditions necessary to observe in order to get best results by its use.

The chlorination of ortho-nitrodiphenyl to produce the compositions of my invention is preferably conducted at gradually rising temperatures so that the latter stages of the chlorination are conducted at a temperature of approximately 100° to 165° C. when an iron catalyst is used. The reaction is exothermic and cooling may be desirable at the start and during the chlorination. A great degree of variation in temperature conditions during the chlorination is permissible but I prefer to observe temperatures up to about 90° C. in the earlier stages of the chlorination and to maintain the temperature below about 140° C. maximum (about 120° C. average temperature) during the final chlorination stage when an iron catalyst is used.

The crude chlorination reaction product contains hydrogen chloride, catalyst, and other extraneous impurities. These materials must be removed if the product is destined for dielectric uses. Several methods of accomplishing this may be resorted to. Purification may be effected by subjecting the crude mixture to acid washing, to remove iron or other metallic particles of catalyst, then residual acid may be removed by means of aqueous alkali washes. Emulsification may occur during washing with aqueous solutions and to inhibit this, solvents such as butanol, trichlorobenzene and toluene may be added. The final purification can be effected by subjecting the product to vacuum distillation. The boiling range of the desired product is about 196° to 230° C. at a pressure of 3 mm. or about 214° to 240° C. at 8 mm. The distilled product may still contain traces of acid and phenolic impurities. Filtration through fuller's earth, preferably Attapulgus earth, will reduce the acidity substantially, although additional washing with alkali (1% sodium hydroxide or 1% sodium carbonate) solutions may be necessary to obtain a product having an acid number below 0.01. To remove hydrogen chloride at the start, aeration, that is, passing a stream of air through the warm (120° C. to 150° C.) reaction mixture, will reduce the initial acidity considerably, in some cases to 0.03% (calculated as hydrogen chloride) or lower. The mixture may then be heated with from 1% to 3% of its weight of slaked lime (calcium hydroxide) at a temperature of 120° to 150° C., filtered through "Supercel," fuller's earth or a similar filtering material, or preferably centrifuged, to remove the lime. Distillation may be used to improve the color and bring about a further reduction in acidity. In such a manner the acidity can be reduced to approximately 0.003% or less, calculated as hydrogen chloride.

It has been discovered, however, that to attain a product of a high degree of purity with a minimum of difficulty and expense, that the purification must be performed by using specific operations carried out in a definite order. This preferred method of purification is as follows: The crude chlorination mixture is aerated while liquid, for example, at a temperature of about 120° to 150° C. or thereabout, to remove dissolved hydrogen chloride until no substantial amount of hydrochloric acid fumes are perceptible. The aerated product at this stage may be stored in iron or metal drums without substantial effect on the metal and without substantial deterioration if it is desired to interrupt the purification at this point. Steam is then bubbled through the batch at a temperature of about 120° to 150° C. or higher to hydrolyze any metallic chlorides and remove hydrogen chloride formed in the hydrolysis. The amount of steam to use for the hydrolysis will vary with the amount and type of metallic catalyst present. When iron metal is used as catalyst for the chlorination approximately 10% steam by weight of the batch is generally sufficient to effect substantially complete hydrolysis of the iron chloride present in the batch and drive out the resulting hydrogen chloride. The product is then aerated with dry air at a temperature of about 120° to 150° C. or thereabout to remove residual traces of hydrogen chloride and water. The first aeration may be dispensed with, if desired, particularly if the crude is not to be stored, since steaming and aeration thereafter will remove dissolved hydrogen chloride. Slaked lime (calcium hydroxide) corresponding to approximately 1% or more of the weight of the batch is then added and the batch is stirred thoroughly at about 120° to 150° C. or thereabout. The function of the lime treatment is to remove the final residual traces of hydrogen chloride and the preceding steaming treatment reduces considerably the amount of lime which would otherwise be required to accomplish this removal. The use of large quantities of lime is undesirable since it carries with it substantial quantities of the product being purified and hence the greater the amount of sludge the smaller is the yield on purification. The lime-treated crude is subsequently passed through a centrifuge, preferably of the solid-bowl (imperforate basket) type to separate the sludge of iron hydroxide and lime. Filtration of the product is virtually impossible since the sludge is of such nature that it clogs clay, cloth and other filtering media. For the same reason, use of a centrifuge of the perforate basket type is not possible. The centrifuging should be conducted at such a temperature that the product is liquid and has a low viscosity. Instead of lime, alkaline solids such as sodium carbonate, sodium hydroxide, barium hydroxide, and the like may be used in the treatment. The centrifuged product is then distilled in vacuum. The distilled product may be subsequently subjected to further purification by means of washes with aqueous sodium hydroxide or sodium carbonate solutions and water or filtration through clay or all of these treatments.

Illustrative methods of preparing preferred compositions of the invention are described in the examples which follow. The properties of the products are listed in the table following the examples.

Example 1

Into a glass flask provided with a chlorine inlet, a stirrer, and a gas outlet, was placed 1535 grams of orthonitrodiphenyl (technical material having crystallizing point of 35.1 to 35.6° C.) and 9 grams of anhydrous ferric chloride (0.67% of the charge). The charge was heated slightly to about 39° C. and then chlorine was passed slowly through the mixture while it was stirred. The progress of the chlorination was observed by noting the temperature, the increase in weight of the reaction mixture and its specific gravity. The chlorination proceeded according to the following log:

| Elapsed time, hours | Temperature | Weight increase | Specific gravity | Approximate degree of chlorination |
| --- | --- | --- | --- | --- |
| | °C. | Grams | | |
| 1.8 | 48 | 210 | | |
| 2.5 | 75 | 484 | 1.280 (60°/15.5° C.) | Monochloro. |
| 5.0 | 107 | 718 | 1.372 (60°/15.5° C.) | Dichloro. |
| 7.7 | 152 | 916 | 1.429 (90°/15.5° C.) | Trichloro. |
| 11.2 | 150 | 1,114 | 1.495 (90°/15.5°) | Tetrachloro. |
| 12.2 | 165 | 1,138 | 1.503 (90°/15.5°) | End. |

The purification of the product was effected as hereinabove described. The crude product was washed with dilute hydrochloric acid solution three times followed by three washes with water. Butanol was used to break the emulsion formed during the washing. The product was freed of water by heating and then distilled in vacuum. The purified product was a liquid having a specific gravity of about 1.487 (90°/15.5° C.) and a dielectric constant of 16 at 25° C. Products of higher dielectric constant result when lower maximum temperatures of chlorination are observed than were used in this example. In this specific example some replacement of the nitro group of the products probably occurred, resulting in a product of low dielectric constant.

Example 2

Into an iron chlorinator packed with an iron catalytic mass, such as is described in my Patent No. 1,892,397, was charged 50 pounds of technical ortho-nitro-diphenyl. The charge was heated to about 80° C. and chlorine was passed through the mass from a weighed cylinder thereof by introducing it at the bottom of the chlorinator. In this manner a thermosyphonic flow of the reacting mass was induced and maintained. The progress of the chlorination was observed by noting the temperature, the weight of chlorine supplied to the reaction mixture from the weighed cylinder and the specific gravity. The log of the chlorination was as follows:

| Elapsed time, hours | Temperature | Chlorine input | Remarks |
| --- | --- | --- | --- |
| | °C. | Pounds | |
| Start | 79 | | Cooling necessary. |
| 2 | 82 | 14.5 | |
| 3.3 | 90 | 22.5 | Temp. allowed to rise. |
| 5 | 122 | 31 | |
| 10 | 129 | 60 | |
| 15 | 125 | 84 | End. specific gravity 1.482 (90°/15.5° C.). |

The purification of the product was conducted as follows: The crude chlorination mixture was aerated at approximately 120° C. to remove dissolved hydrogen chloride until no substantial amount of hydrochloric acid fumes were perceptible. The aerated product thus obtained can be stored in metal drums without substantial effect on the metal and without substantial deterioration if it is desired to interrupt the purification at this point. Steam in an amount corresponding to about 10 per cent by weight of the batch is then bubbled through the stirred aerated crude product at 120° to 150° C. or thereabout to hydrolyze any iron chlorides and remove hydrogen chloride formed in the hydrolysis. The product is then aerated with dry air at a temperature of about 120° to 150° C. or thereabout to remove residual traces of hydrogen chloride and water. Slaked lime (calcium hydroxide) corresponding to approximately 1% or more of the weight of the batch is then added and the batch is stirred thoroughly at 120° to 150° C. or thereabout. The lime-treated crude is then passed through a solid-bowl (imperforate basket) centrifuge to separate the sludge of iron hydroxide and lime. The centrifuged product is then distilled in vacuum. In the table are listed the properties of a batch (Ex. 2 Distilled) purified in this manner. The distilled product may be further purified by washing with aqueous sodium carbonate or sodium hydroxide solutions and water followed by filtration through clay to remove residual hydrogen chloride and phenolic impurities. The properties of another batch of slightly lower chlorine content purified in this manner are listed in the table hereinafter (Ex. 2 Distilled and washed).

*Example 3*

The procedure of Example 2 was effected in a larger iron unit using a charge of 4100 pounds of ortho-nitrodiphenyl. The log of this chlorination was as follows:

| Elapsed time, hours | Temperature | Specific gravity |
|---|---|---|
|  | °C. |  |
| Start | 80 | 1.170 (60°/15.5° C.) |
| 1 | 93 | 1.230 |
| 2 | 88 | 1.246 |
| 6 | 95 | 1.318 |
| 7 | 104 | 1.335 |
| 9 | 118 | 1.383 (90°/15.5° C.) |
| 11 | 120 | 1.438 |
| 13 | 120 | 1.460 |
| 15 end | 121 | 1.485 |

The product was purified according to the methods outlined in Example 2. The properties of two samples thus purified are listed in the table hereinafter under "Ex. 3."

*Properties of products*

The products hereinabove prepared had the following properties. In the first column, under "Specification" are listed the permissible ranges of preferred products for use as dielectric liquids and these values represent approximately the general characteristics of the products of my invention:

Pour point was determined according to ASTM method D 97–39. The pour point is the lowest temperature at which the material will pour or flow when it is chilled without disturbance under the conditions prescribed in the method.

Dielectric constants were measured at the temperature indicated using 1000-cycle direct-current oscillation, obtained by means of a General Radio Co. type 213-B sine wave audio oscillator powered by a 6-volt storage battery. The value is defined as the ratio of the equivalent parallel capacitance of a capacitor in which the material is the dielectric at the specified frequency and temperature to the capacitance of the same capacitor with vacuum as the dielectric. The tests were performed by measuring the change in capacitance of a multiplate variable air condenser between the fully open and fully closed positions by means of a General Radio type 216 condenser type 222-L as a standard of capacitance.

Dielectric strength was determined in accordance with ASTM method D–149–39T using a General Electric 30,000 volt, 0.5 k. v. a. portable oil tester.

The value represents the maximum potential gradient that the material can withstand without rupture and is expressed in kilovolts impressed across a gap of 0.10 inch between electrodes 1 inch in diameter.

Resistivity, or specific resistance or volume resistivity is the resistance between two opposite faces of a unit cube of the substance. This property is measured by means of a General Radio type 544-A megohm meter at the temperature indicated.

The ageing test represents the value of the resistivity of the material after exposure to air at 100° C. for 96 hours.

Viscosity was determined according to ASTM method D–88–38 using the Saybolt viscometer with the Universal orifice opening at the temperatures indicated. It represents the time required (in seconds) for a 60-ml. sample of the material to flow through the orifice.

Acid number or acid neutralization number was determined by using phenolphthalein as the indicator and represents the weight in milligrams of sodium hydroxide necessary to neutralize 1 gram of the material. The number is sometimes expressed in milligrams of potassium hydroxide but in these tests sodium hydroxide was the standard.

| Sample | Specification | Ex. 2 distilled | Ex. 2 distilled and washed | Ex. 3 | Ex. 3 |
|---|---|---|---|---|---|
| Pour point °C | 30 or less |  |  | 22 | 24. |
| Dielectric constant, 30° C | 18 to 24 | 22.0 | 21.8 | 23.5 | 21.4. |
| Dielectric constant, 100° C | 18 to 24 |  | 19.1 | 23.5 | 23.0. |
| Dielectric strength 25° C kilovolts | 10 to 50 |  |  | 15 | Greater than 30. |
| Resistivity, 100° C ohms/cm.³ |  |  |  | 0.4×10⁹ | 0.55×10⁹. |
| Ageing test, 100° C ohms/cm.³ |  |  |  | 0.7×10⁹ | 0.3×10⁹. |
| Viscosity, 98.9° C Saybolt seconds |  | 65.1 |  | 61.6 | 63.4. |
| Viscosity, 130° C do |  | 40.3 |  | 40.0 | 40.0. |
| Specific gravity, 90°/15.5° C | 1.45 to 1.51 | 1.475 | 1.468 | 1.468 | 1.470. |
| Acid number | Less than 0.1 | 0.22 | Less than 0.001 | 0.007 | 0.004. |
| Free chlorine per cent | Less than 0.001% |  |  | Less than 0.001% | Less than 0.001%. |
| Total chlorine do | 38 to 44 | 40.5 | 39.8 | 39.6 | 40.0. |
| Color, N. P. A | Less than 3.0 |  | 2.0 | 2.5 | 2.0. |

In the above table of properties the values for the respective constants were determined in the customary manner. The following should be noted with respect to certain of these values:

Free chlorine was determined by making an aqueous extract of the material and titrating this extract with standard silver nitrate solution and represents the amount of free chlorine, hydrochloric acid or inorganic chlorides present in the sample.

Total chlorine was determined by means of a fusion of the material with sodium peroxide and subsequent determination of the resulting inorganic chlorides by standard silver nitrate solution. It represents the amount of both free and combined organic and inorganic chlorine in the material.

Color was determined by means of a Union colorimeter using the N. P. A. color scale in accordance with ASTM method D–155–39T.

In formulating compositions for use as dielectric materials in electrical apparatus the products of the present invention may be used in admixture with chlorinated benzenes, chlorinated diphenyls, chlorinated naphthalenes and similar materials. An example of such a composition is one consisting of 60 parts by weight of tetrachlorinated orthonitrodiphenyl and 40 parts by weight of Aroclor 1242 (diphenyl chlorinated to 42% chlorine content).

Inasmuch as the foregoing specification comprises preferred embodiments of the invention, it is to be understood that the invention is not limited thereto and that changes and modifications may be made therein without departing substantially from the invention, which is defined in the appended claims.

I claim:

1. A substantially non-crystallizing normally liquid chlorinated ortho-nitrodiphenyl mixture having a chlorine content within the range of about 38 to about 44% and having a dielectric constant within the range of about 18 to about 24 at 30° C., said chlorinated ortho-nitro diphenyl being derived by the chlorination of ortho-nitrodiphenyl.

2. A substantially non-crystallizing normally liquid polychlorinated mono-ortho-nitrodiphenyl mixture obtained by the direct chlorination of mono-ortho-nitrodiphenyl until the chlorine content of the product is within the range of 38 to 44% and the specific gravity is within the range of about 1.45 to about 1.50 (90°/15.5° C.).

3. A substantially non-crystallizing normally liquid chlorinated ortho-nitrodipenyl mixture having a chlorine content of approximately 40%, a pour point of approximately 20° C. and a dielectric constant of approximately 20, said chlorinated ortho-nitrodiphenyl mixture derived by the chlorination of ortho-nitrodiphenyl.

4. The method of producing a substantially non-crystallizing normally liquid chlorinated ortho-nitrodiphenyl mixture which comprises chlorinating ortho-nitrodiphenyl in the liquid phase in the presence of a catalyst until the chlorine content of the product is within the range of 38 to 44%.

5. The method of chlorinating ortho-nitrodiphenyl to produce a substantially non-crystallizing normally liquid chlorinated ortho-nitrodiphenyl mixture having a chlorine content within the range of about 38 to about 44%, which comprises disposing ortho-nitrodiphenyl throughout a mass of catalyst and inducing and maintaining a thermosyphonic flow of the reacting mass through the catalyst mass by means of the action of incoming chlorine gas.

6. A liquid composition of matter which is suitable for capacitor impregnation consisting essentially of ortho nitro tetra chlor diphenyl and derived by the chlorination of ortho-nitrodiphenyl.

7. A liquid composition of matter consisting essentially of chlorinated mono-ortho-nitro diphenyl and derived by the chlorination of mono-ortho-nitro diphenyl.

8. A liquid composition of matter consisting essentially of chlorinated mono-ortho-nitro diphenyl and derived by the chlorination of mono-ortho-nitro diphenyl, said composition having a chlorine content of approximately 38 to 44%.

9. A dielectric material comprising essentially ortho-nitro-trichlordiphenyl, and derived by the chlorination of mono-ortho-nitrodiphenyl.

10. A dielectric material comprising essentially ortho-nitro-tetrachlordiphenyl and derived by the chlorination of mono-ortho-nitro-diphenyl.

RUSSELL L. JENKINS.